Sept. 22, 1942.　　　T. L. MAYRATH　　　2,296,289
CLUTCH AND TRANSMISSION OPERATING MECHANISM
Filed Sept. 15, 1939　　　4 Sheets-Sheet 1

INVENTOR.
BY THOMAS L. MAYRATH
ATTORNEY.

Sept. 22, 1942.  T. L. MAYRATH  2,296,289
CLUTCH AND TRANSMISSION OPERATING MECHANISM
Filed Sept. 15, 1939  4 Sheets-Sheet 3

INVENTOR.
THOMAS L. MAYRATH
BY H. O. Clayton
ATTORNEY.

Patented Sept. 22, 1942

2,296,289

UNITED STATES PATENT OFFICE 2,296,289

CLUTCH AND TRANSMISSION OPERATING MECHANISM

Thomas L. Mayrath, South Bend, Ind., assignor to Bendix Aviation Corporation, South Bend, Ind., a corporation of Delaware Application September 15, 1939, Serial No. 295,003

6 Claims. (Cl. 192—3.5)

This invention relates in general to the power transmission mechanism of an automotive vehicle and in particular to means for operating a friction clutch and a change-speed transmission of a vehicle provided with a fluid clutch.

An object of the invention is to provide manually and power operated means, controlled in part by the accelerator and by a lever or selector member preferably mounted on the steering post immediately beneath the steering wheel, for actuating the friction clutch and the change-speed transmission of an automotive vehicle.

Yet another object of the invention is to provide, in a mechanism for operating the aforementioned transmission, a pressure differential operated motor operably connected to the transmission, said motor being controlled by electromagnetically operated valves, said valves being automatically controlled, in part, by vehicle speed-responsive mechanism, whereby the shifting of gear and accordingly the setting of the transmission is dependent upon the speed of the vehicle.

The invention further contemplates the provision of a power mechanism, controlled in part by the accelerator and in part by a governor, for operating the clutch of an automotive vehicle, said governor also serving, in part, to control power means for operating the change-speed transmission of the vehicle.

Another object of the invention is to provide means for operating the aforementioned transmission, said means being manually operated to place the transmission either in low or in reverse gear and automatically operated, by power means, to place the transmission either in second or in high gear.

A still further object of the invention is to control a transmission operating means by means including the accelerator of the vehicle and a selector, preferably positioned beneath the steering wheel.

One of the most important objects of the invention is to provide, in an automotive vehicle equipped with a fluid clutch, means, including but two manually operated controls, for obtaining the greatest efficiency and effectiveness of operation of said clutch and at the same time eliminating an objectionable feature caused by said clutch, namely, the creeping of the vehicle after it has been brought to a stop.

Yet another object of the invention is to provide but three members, namely, the accelerator, the clutch pedal and a lever preferably mounted beneath the steering wheel of the vehicle, for controlling the operation of the clutch, the throttle and the transmission of the vehicle, the throttle being operated solely by the physical effort of the driver, the clutch by either the physical effort of the driver or power and the transmission partly by the physical effort of the driver of the vehicle and partly by power, to which power may be added the physical effort of the driver.

The invention further contemplates the provision of power means for operating the friction clutch of an automotive vehicle, said power means being controlled in part by the accelerator of the vehicle, the change-speed transmission of the vehicle and a propeller shaft operated governor, whereby the clutch is automatically disengaged by the power means when the accelerator is released and the transmission is in any setting except high gear, said disengagement being effected when the accelerator is released, and the transmission is in high gear only when the speed of the vehicle is decreased to or below a predetermined factor.

Yet another object of the invention is to provide, in combination with a fluid clutch or so-called fluid-drive now being used on the Chrysler Custom Imperial automobile, means for operating a three-speeds forward and reverse transmission positioned between said clutch and the drive-wheels of the vehicle, said transmission operating means being operative to automatically place the transmission in second gear when the speed of the vehicle drops to or below a predetermined factor and to automatically place the transmission in high gear when the speed of the vehicle exceeds said factor.

Yet another object of the invention is to provide, in an automotive vehicle, a power transmission for interconnecting the internal-combustion engine and the driving wheels of the vehicle, said transmission including a fluid clutch, a three-speeds forward and reverse change-speed transmission and a spring operated disk plate clutch, the latter being interposed between the fluid clutch and the change-speed transmission, said mechanisms being actuated by cooperating power means and physically operated means, the power means for actuating the transmission being operative to automatically place the transmission either in second gear or in high gear, depending upon the speed of the vehicle, and the power means for actuating the clutch functioning automatically to disengage the clutch when the speed of the vehicle is below a certain factor and the accelerator is at the time released.

Other objects of the invention and desirable details of construction and combinations of parts will become apparent from the following description of a preferred embodiment, which description is taken in conjunction with the accompanying drawings, in which.

Figure 1:
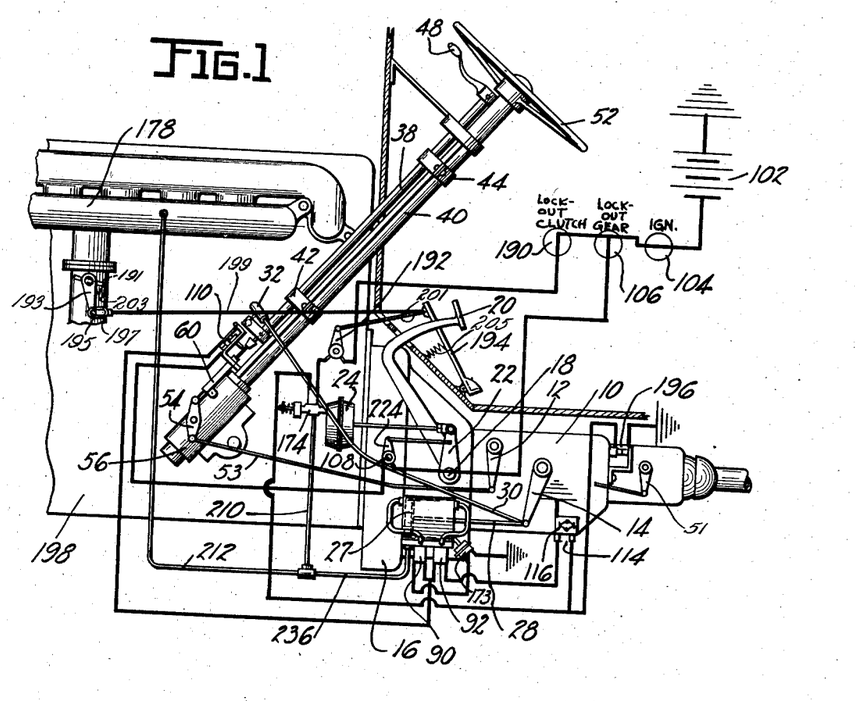
Figure 1 is a diagrammatic view of the clutch and transmission operating mechanism constituting my invention; the hand operated selector beneath the steering wheel being moved 90° out of position to make possible a disclosure of said selector.

Referring now to Figure 1, disclosing a preferred embodiment of my invention, a three-speeds forward and reverse transmission 10 is operated by means of cranks 12 and 14, the crank 12 serving to operate the shift rail selecting mechanism of the transmission and the crank 14 serving to operate that part of the transmission functioning to move the selected rail to establish the transmission in the desired gear ratio. The transmission is of a conventional type, including a second and high gear shift rail and a low and reverse gear shift rail. Such a transmission, that is, one provided with two shift rails, a crank for operating the rail selecting mechanism and another crank for actuating the shift rail operating mechanism, is now used on the 1939 Cadillac automobile. No claims is made to this transmission; accordingly, no need is seen for disclosing it in detail. Furthermore, it will be obvious that other well-known step-type change-speed transmission, employing the aforementioned two cranks and two shift rails, might be operated by the mechanism of my invention.

My invention has to do with the manually and power operated mechanism for actuating the cranks 12 and 14, which mechanism is to a degree interlocked with manually and power operated mechanism for operating a conventional friction clutch having driving and driven plates forced into engagement by clutch springs.

An important feature of my invention lies in the combination of a fluid clutch or so-called fluid coupling 16, such as that now being used on the 1939 Chrysler Custom Imperial automobile, the aforementioned friction or so-called disk plate clutch and the interlocked transmission and disk plate clutch operating mechanism.

The disk plate clutch is operably connected to a clutch throw-out shaft 18, to which is connected a foot operated clutch pedal 20 and a crank 22 actuated by a vacuum motor 24. The clutch pedal 20 is preferably connected to the shaft by a lost-motion connection, not shown, whereby the clutch pedal remains stationary when the clutch is disengaged by the clutch operating power means, the shaft, however, being rotated to disengage the clutch when the pedal is depressed.

Figures 2, 3, 4:
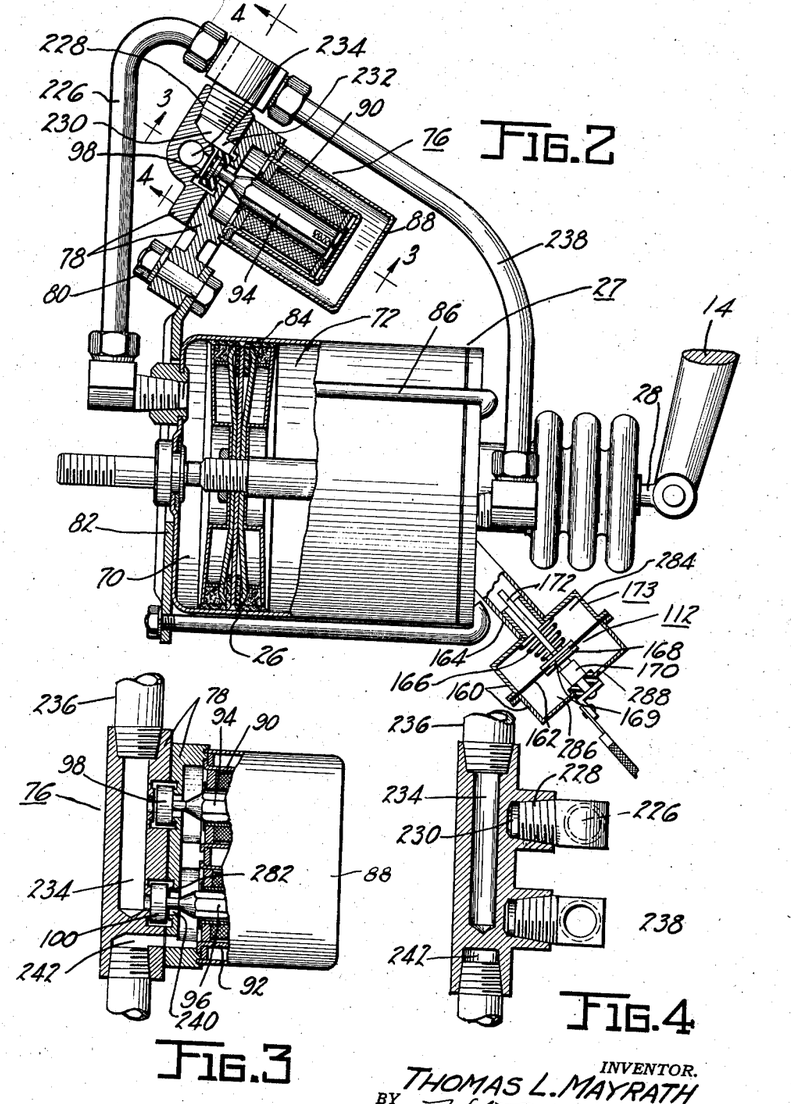
Figure 2 is a view, largely in section, disclosing in detail the transmission operating motor and its control valve mechanism.
Figures 3 and 4 are views, taken on the lines 3—3 and 4—4 of Figure 2 respectively, disclosing details of part of the valve mechanism for controlling the transmission operating motor of my invention.

Describing now in detail the transmission operating mechanism of my invention, a piston 26 of a double-ended double-acting vacuum operated motor 27, disclosed in Figure 2, is connected to the shift rail operating crank 14 by a rod 28. The crank 14 may also be rotated by manually operated means including a rod 30 having an enlarged end member 32, as disclosed in Figures 1 and 8. To the end of the member 32 there is secured a spherically-shaped member 34, fitting within a recess in the end of a crank 36 secured to the end of a tube 38, the latter being secured to the steering post 40 of the vehicle by brackets 42 and 44. As disclosed in Figures 1 and 6, a hollow housing member 46 is secured to the end of the tube 38 and a selector lever 48 is pivotally mounted at 50 to said member. Rotation of the selector 48, in a plane parallel to the steering wheel 52 of the vehicle, serves to rotate the tube 38 connected thereto which, in turn, through the intermediary of the crank 36 and its universal connection with the member 32, places the rod 30 either in tension or in compression to rotate the shift rail operating crank 14. This mechanism for manually operating the crank 14 constitutes an important feature of my invention, for with such a mechanism said crank may be operated manually in the event of failure of the power means. Furthermore, as will be made evident hereinafter, this mechanism provides the sole means for placing the transmission either in low gear or in reverse gear.

Figure 6:
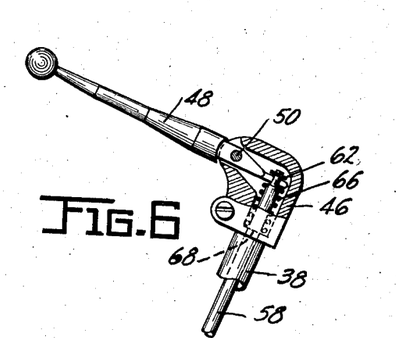
Figure 6 is a view, partly in section, of the transmission controlling selector lever preferably secured to the steering post beneath the steering wheel.
Figure 8:
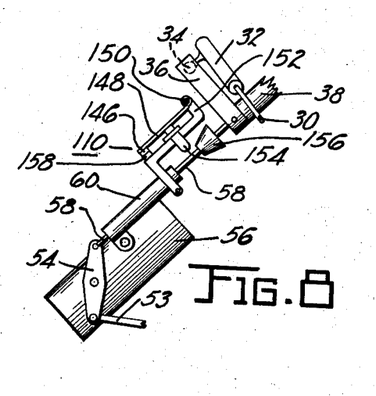
Figure 8 is a view disclosing in detail the cross-shift lock-out switch of my invention.

The crank 12, which operates the shift rail selecting mechanism, is rotated by the manually operated mechanism disclosed in Figures 1, 6 and 8. This mechanism includes a rod 53, preferably connected to a lever 54 pivotally mounted on a support 56 for the steering post. To one end of the lever 54 there is pivotally connected a rod 58, which extends through a housing member 60, also secured to the support 56. From the member 60 the rod 58 extends through the tube 38 and is provided, at its upper end, with a pin 62. One end of the selector 48 is provided with an opening, and the selector is, as disclosed in Figure 6, sleeved over the pin 62. A spring 66, surrounding the rod 58 and interposed between a seat 68 in the housing member 46 and the end of the selector, serves to move or bias the rod upwardly and thereby maintain the crank 12 in position to effect a second or high gear operation of the transmission; that is, unless the driver of the vehicle rotates the selector upwardly or counterclockwise, in a plane perpendicular to the plane of the steering wheel, the compressed spring 66 serves to maintain the selector in position preparatory to placing the transmission either in second or in high gear by the power means described in detail hereinafter. The manual operation of the transmission to establish the same in either reverse gear or low gear is accomplished by rotating the selector in a plane parallel to the plane of the steering wheel. There are thus three operative positions in which the selector is most often placed with the mechanism of my invention. One of these positions is described above wherein the selector is biased by the spring 66 to a position preparatory to effecting a power operation of the transmission. This may be termed the automatic or power position of the selector; and the two other positions in which the transmission is most often placed are its low gear and reverse gear positions. Of course, the selector may also be placed in a transmission neutral position and should all of the power means fail the selector may be manually moved to establish the transmission in either second gear or high gear.

Describing now the valvular mechanism for controlling the operation of the transmission operating motor 27, the piston or power element 26 of the motor divides the same into two compartments 70 and 72. The gaseous pressure within these compartments determines the differential of pressures acting upon the piston to move it to rotate the crank 14 clockwise or counterclockwise, and thus establish the transmission in gear. This gaseous pressure is controlled by a valvular unit 76, disclosed in detail in Figures 2, 3 and 4, said unit including a two-part body member 78, clamped by bolts 80 to a bracket 82 secured to the casing 84 of the motor 27 by rods 86. To the body member 78 of the valve unit there is secured a housing 88 within which are secured solenoids 90 and 92. To the armatures 94 and 96 of said solenoids there are secured valve members 98 and 100 respectively.

Figure 9:
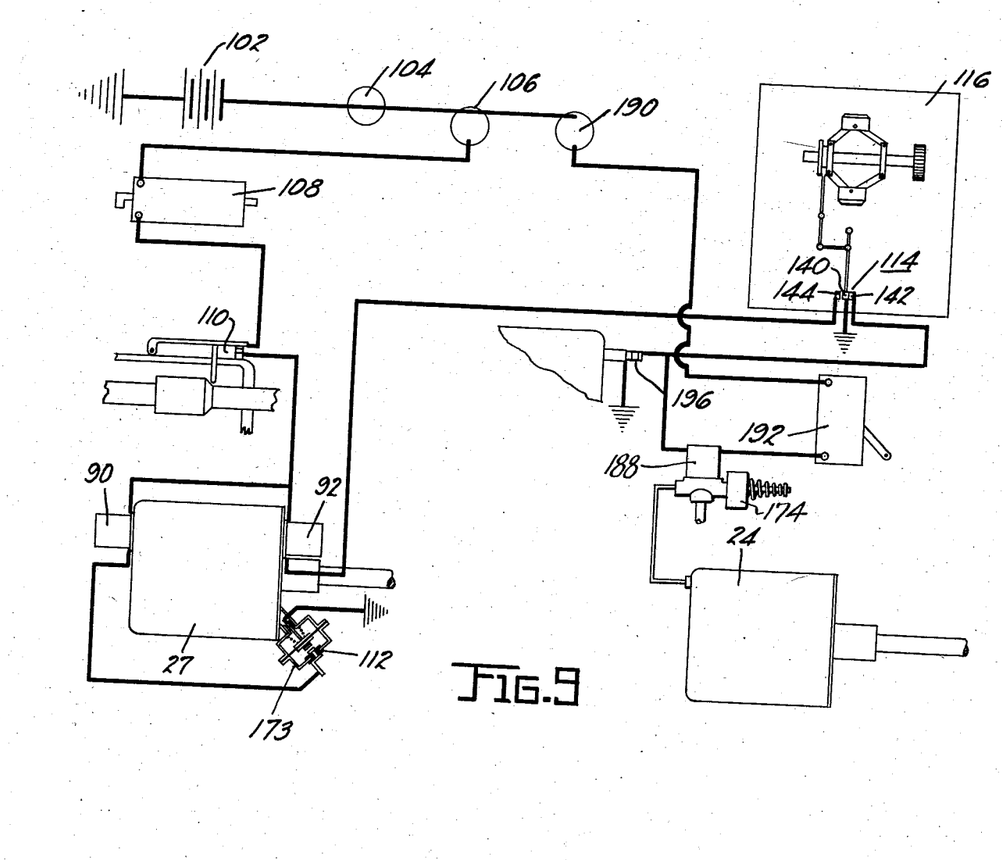
Figure 9 is another diagrammatic view of my invention disclosing, in particular, the electrical hook-up.

Describing now the electrical circuits and switches for controlling the operation of the solenoid 90, the connection between a grounded battery 102 and the ground to complete the circuit includes an ignition switch 104, a dash-mounted lock-out or cut-out switch 106, a clutch operated breaker switch 108, a so-called cross-shift lock-out switch 110, solenoid 90 and a power operated switch 112. These switches are, as disclosed in Figure 9, connected in series. As to the solenoid 92, which is in parallel with the solenoid 90, the circuit includes the aforementioned switches 104, 106, 108 and 110, the solenoid 92 and a two-pole switch 114 operated by a propeller shaft operated fly-ball governor 116 of any well-known design.

Figure 7:
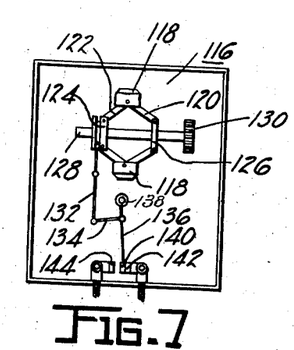
Figure 7 is an enlarged view of the propeller shaft operated governor and the switch operated thereby, said governor serving to control both the clutch and the transmission operating power means.

Such a governor is disclosed in Figure 7, wherein the flyballs 118 are, through the intermediary of links 120 and 122 and collars 124 and 126, actuated by a shaft 128, to which shaft there is secured a gear 130 meshed with a gear, not shown, driven by the propeller shaft of the vehicle or means connected thereto. The collar 124 is provided with a groove receiving one end of a lever 132 pivotally connected to a link 134, which is pivotally connected to a lever 136 fulcrumed at 138. The end of the lever 136 constitutes a contact member 140 alternately movable into contact with either contact 142 or contact 144, depending of course upon the speed of the vehicle. When the vehicle is moving at, say, five M. P. H. or less, lever 136 is moved so as to bring contacts 140 and 142 into engagement; whereas, when the vehicle is moving at, say, fifteen M. P. H. or at a higher speed, said lever is moved so as to bring contacts 140 and 144 into engagement. The governor and its connections, to which no claim is made, may of course be adjustable to effect the desired operation of the switch.

Describing now in detail the cross-shift switch 110, which is disclosed in detail in Figure 8, the same comprises a contact 146 mounted on one end of a lever 148 pivoted at 150 to a bracket 152. The bracket is secured to the housing member 60 and is provided with an opening to receive a pin 154 secured to the lever 148. The end of said pin is rounded to cooperate with a cone 156 fixedly secured to the rod 58. When the selector 48 is rotated counterclockwise, in a plane perpendicular to the plane of the steering wheel, the rod 58 and its connected cone 156 are moved downwardly, thus forcing the cone into contact with the pin 154 to move the latter outwardly. This operation serves to rotate the lever 148 about its fulcrum to thus move the contact 146 out of engagement with a contact 158 and break the circuit to the solenoid 90.

The power operated switch 112, disclosed in detail in Figure 2, includes a two-part housing 160. Between the parts of the housing there is secured a diaphragm 162, and the housing is secured by a tube 164 to the casing 84 of the motor 27. A spring 166 serves to urge a contact 168, secured to a metallic plate 169 fixed to the diaphragm 162, into contact with a contact 170, which is wired to solenoid 90. A pin 172, secured to the diaphragm 162 and part of contact 168, is wired to the chassis of the vehicle to effect a ground connection. The housing 160 and the diaphragm 162 together constitute a pressure differential operated motor 173 for operating, together with the spring 166, the switch 112: accordingly, the switch may be said to be power operated.

The cut-out or so-called lock-out switch 106 and the clutch operated switch 108 are not disclosed in detail, inasmuch as they are merely breaker switches of conventional design.

Figure 5:
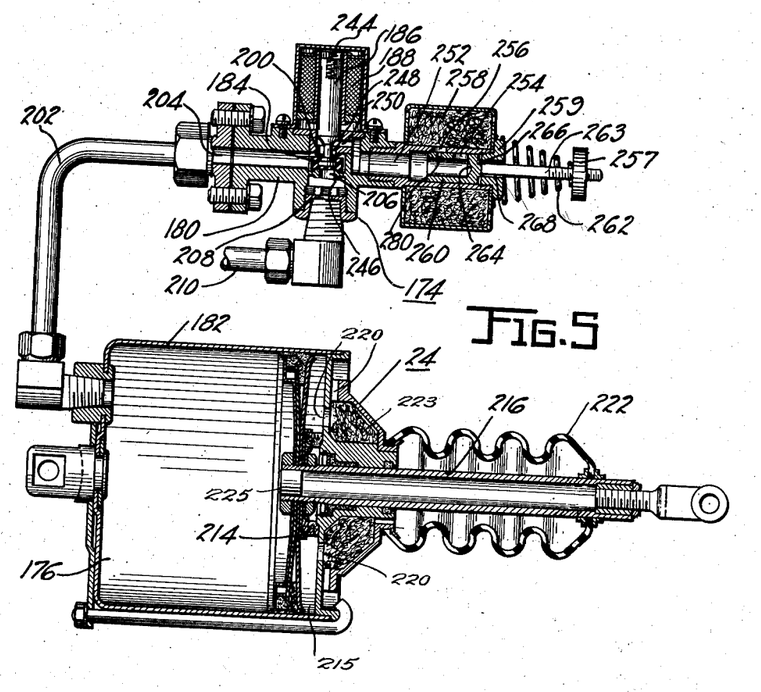
Figure 5 is a sectional view of the clutch operating motor and its control valve mechanism.

Describing now the power means, Figure 5, for operating the disk plate clutch, a three-way valve unit 174 serves either to connect a compartment 176 of the motor 24 to the atmosphere to de-energize the motor and thereby permit the clutch springs to maintain the clutch engaged or to connect said compartment to a source of vacuum, preferably the intake manifold 178, to partially evacuate the compartment and thus energize the motor to effect a disengagement of the clutch. As disclosed in Figure 1 and as diagrammatically disclosed in Figure 5, the three-way valve, which will be described in greater detail hereinafter, includes a casing 180 secured to the casing 182 of the motor 24, said casing 180 housing a valve member 184 secured to the end of an armature 186 constituting the movable part or power element of a solenoid 188. The solenoid is energized to move the armature upwardly by closing an electrical circuit including, in series, the ignition switch 104, a cut-out or breaker switch 190, preferably mounted on the dashboard of the vehicle, a breaker switch 192 operated by the accelerator 194 of the vehicle, the solenoid 188 and a breaker switch 196 operated by the second and high gear shift rail to open or break the switch when and only when the transmission is in high gear. At all other times the switch 196 is closed, that is, when the transmission is in reverse gear, second gear, low gear or neutral. These breaker switches are not disclosed in detail, inasmuch as no claim is made thereto: furthermore, they are well known to those skilled in this art. It is to be noted from an inspection of Figure 1 that the throttle valve 191 of the carburetor is actuated by means of a crank 193 having a pin 195 extending laterally from its lower end and that a slotted member 197, contactible with said pin, is secured to one end of a link 199 connected to the accelerator 194. The switch 192 is connected to the accelerator by means of a link 201. By means of this construction when the accelerator 20 is depressed the switch 192 is opened (before the throttle is opened) and upon releasing the accelerator the throttle is closed before said switch is closed. A return spring 203, secured to the crank 193, serves to bias the throttle valve 191 to its closed position and a return spring 205 serves to bias the accelerator to its throttle closed position.

It may be stressed here that the governor operated switch 114, disclosed in detail in Figure 7, constitutes one of the important features of my invention; for with this mechanism there is provided an interlock between the clutch and transmission operating mechanisms. As to the interrelation of the switches 114 and 196, when the contacts 140 and 142 are engaged, that is, when the speed of the vehicle is equal to or less than five M. P. H., a ground connection is made, irrespective of whether or not the switch 196 is open or closed. This interlock feature will be referred to hereinafter.

Describing now the complete operation of the transmission and clutch operating mechanism constituting my invention, and incidentally completing the detailed description thereof, we will assume the dash-mounted switches 104, 106 and 190 to be closed and the internal-combustion engine 198 to be idling, thereby creating a partial vacuum in the intake manifold 178 of the internal-combustion engine. The accelerator 194 is at the time released, thereby closing the breaker switch 192. Furthermore, the cross-shift switch 110 is closed, inasmuch as the selector 48 is at the time biased by the spring 66 to its second and high gear cross-shift position. Incidentally, the selector is, in Figure 1, shown 90° out of position for the purpose of more clearly disclosing the invention. The switch 196 is at the time closed, inasmuch as the transmission is not in high gear. The power operated switch 112 is at the time closed by power means, that is, the spring 166, and the contacts 140 and 142 of the switch 114 are in engagement, inasmuch as the vehicle is at a standstill.

Continuing the description of the operation of the mechanism and assuming the parts of the same to be in the positions set forth above, the solenoid 188 of the clutch operating mechanism will be energized, thus moving the valve member 184 upwardly to seat said member upon a valve seat 200. The compartment 176 of the clutch operating motor 24 will then be partially evacuated, for there is provided a fluid transmitting connection between the said compartment and the intake manifold via a conduit 202, a duct 204 in the valve casing 180, ports 206 and 208 in said casing and conduits 210 and 212 leading to the intake manifold 178. The piston 214 of the clutch motor 24 is thus subjected to a differential of pressures, for a compartment 215 of the motor is at the time subjected to atmospheric pressure via openings 220 in the end plate structure of the cylinder 182. The air passing through said openings is filtered by suitable means such as steel wool 223 or its equivalent. A plug 225 is inserted in the inner end of the rod 216 to prevent the withdrawal of air from the interior of said rod. The piston 214 is accordingly moved to the left to effect a disengagement of the clutch, and when the clutch is disengaged a crank 224, Figure 1, is moved sufficiently to close the switch 108.

The closing of the switch 108 closes the circuit including the solenoid 90; accordingly, the latter is energized. The armature 94 is thus moved to the position disclosed in Figures 2 and 3, opening the valve 98 and interconnecting the compartment 70 of the transmission operating motor 27 with the intake manifold via a conduit 226, port 228 in the valve body member, a duct 230, a port 232 and a duct 234 in said member, and a conduit 236 leading to the conduit 212, which leads to the intake manifold. The compartment 70 being connected to the intake manifold is immediately partially evacuated and the piston 26 is moved to the left, to the position disclosed in Figures 1 and 2, to thereby rotate the crank 14 and place the transmission in second gear that is, effect what may be termed a down-shift operation of the transmission. The piston 26 moves to the left, Figure 2, for it is then subjected to a differential of pressures, compartment 72 of the motor 27 being at the time vented to the atmosphere via a conduit 238 and ports 240 and 242, Figure 3.

After the transmission is established in second gear, the accelerator is then depressed to speed up the engine and engage the clutch. Describing the clutch engaging operation of the motor 24, when the accelerator is depressed, the switch 192 is opened during the first increment of movement of the accelerator thereby deenergizing the solenoid 188 and this operation permits spring 244 to move the armature 186 and its connected valve member 184 downwardly, the latter member seating upon a valve seat 246. The compartment 176 of the motor 24 is then vented to the atmosphere via conduit 202, duct 204, a port 248, ducts 250 and 252, ports 254 and 256 and the air cleaner 258. The ports 254 and 256 register to effect this result, for when the clutch springs begin to move the driving clutch plate toward its clutch engaged position in contact with the driven plate of the clutch, that is, when the piston begins its movement to the right, Figure 5, there is created by the action of the springs a partial vacuum in the compartment 176 and the aforementioned fluid transmitting connections interconnecting said compartment with the duct 252. A reciprocable tubular valve member 260, biased to the position disclosed in Figure 5 by a spring 262, is moved to the left, Figure 5, to effect the aforementioned registering of ports 254 and 256. The spring 262 is sleeved over a stem 263, secured to and extending from one end of said valve member, and is interposed between a nut 257, threadedly mounted on the stem 263, and a plug 259. This movement of the valve member 260 to the left is effected, inasmuch as said member is at the time subjected to a differential of pressures overcoming the effect of the spring 262; for the duct 252 is partially evacuated, thus subjecting the inner face 264 of the valve member to the rarefied air, and the right-outer face 266 of the valve member is vented to the atmosphere via an opening 268 in the plug 259. When the clutch plates contact, the movement of the driving clutch plate is appreciably slowed down, immediately resulting in an appreciable increase of the gaseous pressure within the compartment 176. The spring 262 then moves the valve member 260 to the right to the position disclosed in Figure 5, a relatively small port 280 in the valve member coming into registry with the port 256. A relatively slow bleed of air into the compartment 176 is then initiated.

There is thus effected two distinct stages of movement of the driving clutch plate as it moves into complete engagement with the driven clutch plate, the first stage being relatively fast by virtue of the rapid inrush of air into the compartment 176 and the second stage being relatively slow by virtue of the relatively slow bleed of air into said compartment via the registered ports 280 and 256. The time of operation of the valve member 260 may be regulated by an adjustment of the nut 257, which determines the load exerted by the spring upon the valve. The fluid coupling 16 cooperates with the friction clutch operating two-stage motor 24 for said fluid coupling cushions the shock when the driving clutch plate of the friction clutch contacts the driven plate of said clutch; furthermore, the fluid clutch cooperates with the clutch control motor to effect the desired smooth engagement of the friction clutch, that is the desired acceleration of the vehicle during the aforementioned second stage clutch engaging operation of said motor; and by virtue of the lost motion connection 197 and the relatively high speed of operation of the valve member 260 it is apparent that said valve member is moved to its position to terminate the fast bleed of air into the motor either immediately before or at substantially the same time the opening of the throttle 195 is initiated. The relatively slow movement of the driving clutch plate is therefore effected as the throttle is being opened.

The clutch being engaged, the accelerator is further depressed to speed up the engine to effect the desired speed of the vehicle and as previously described this increase of the speed of the engine results in the operation of the fluid coupling to effect, in cooperation with the second stage clutch engaging operation of the motor 24, a smooth completion of the engagement of the friction clutch. When this speed equals, say, fifteen M. P. H. or the top setting of the governor 116, whatever it may be, the contacts 140 and 144 engage each other, making possible a high gear operation of the transmission.

Should the driver desire to effect an up-shift operation of the transmission, that is a shift of the transmission into high gear, he merely has to release the accelerator, for a release of the accelerator results in a closing of the switch 192, and since the transmission is then in second gear the switch 196 is closed. The circuit to the solenoid 188 is accordingly closed and the three-way valve 174 again operated to open the valve. The motor 24 is accordingly again energized, the friction clutch is disengaged and the switch 108 is again closed.

Describing now an important feature of my invention, when the switch 108 is closed and the contacts 140 and 144 of the switch 114 engaged, the circuit including the solenoid 92 is completed, resulting in an energization of said solenoid. The armature 96 of the solenoid 92 is thus moved to the right, Figure 3, to seat the valve member 100 upon a seat 282 and connect the compartment 72 of the motor 27 with the intake manifold. As soon as the evacuation of the compartment 72 is initiated, a compartment 284 of the switch operating motor 172 is also evacuated, for the compartments 72 and 284 are interconnected by the tube 164. The diaphragm 162 is then subjected to a differential of pressures, for a compartment 286 of the motor is vented to the atmosphere via an opening 288 in the housing 160. The diaphragm 162 is thus moved upwardly, Figure 2, to open the switch 112 and deenergize the solenoid 90. The compartment 70 of the motor 27 is thus vented to the atmosphere and there results a movement of the piston 26 to the right to effect a clockwise rotation of the crank 14 to place the transmission in high gear.

The transmission having been established in high gear, the accelerator is again depressed to effect a clutch engaging operation of the motor 24 and an opening of the throttle to speed up the vehicle. Assuming the vehicle to be traveling at or above fifteen M. P. H. to maintain the contact 140 away from contact 142, subsequent release of the accelerator will not effect a clutch disengaging operation of the motor 24, for it will be remembered that when the transmission is in high gear the second and high gear shift rail functions to open the switch 196. Both the solenoid 188 and the motor 24 are accordingly deenergized and the clutch remains engaged. However, should the speed of the vehicle be reduced to five M. P. H. or less, and the transmission remain in high gear, the circuit necessary to energize the solenoid 188 will be completed and the clutch will be automatically disengaged.

There is thus provided manually and power operated means for operating both the friction clutch and the change-speed transmission of the automobile, such means cooperating with the fluid clutch 16, which is placed ahead of the friction clutch in the power transmitting connection between the internal-combustion engine and the drivewheels of the vehicle. With the clutch and transmission operating mechanism of my invention, the friction clutch is automatically disengaged and the transmission is automatically placed in second gear, that is shifted down when the vehicle is stopped and the accelerator is released. Upon depressing the accelerator, the friction clutch is engaged and the vehicle is placed in motion, the torque being transmitted through the fluid clutch 16, and as previously described the two-stage engagement of the friction clutch by means of the motor 24 cooperates with the fluid coupling in effecting both a smooth start of the vehicle from rest and a smooth coupling of the internal combustion engine with the transmission when the vehicle is in motion and after the transmission has been operated to shift gears.

If the friction clutch operating power means of my invention is for any reason inoperative, then said clutch should be manually disengaged to facilitate the manual operation of the transmission in placing the same in either its low gear or its reverse gear setting, for if this is not done there would be difficulty in demeshing and meshing the gears of the transmission due to the operation of the fluid coupling. However, after the vehicle is under way there is then no need to disengage the friction clutch to effect a smooth low gear to second gear or second gear to high gear up-shift operation of the transmission by the motor 27, for when the accelerator is released to idle the engine the torque of the latter is reversed, that is, the engine is then no longer acting as a prime mover or source of power to drive the car.

This smooth up-shift operation of the transmission is then made possible by virtue of the reversal of the engine torque and the operation of the fluid coupling and a free-wheeling unit 51 referred to hereinafter. Explaining the operation of the latter mechanisms during this up-shift operation of the transmission the fluid coupling by virtue of the fluid therein acts as a yieldable member and the free-wheeling unit serves to unload the gears of the transmission from the then rotating propeller shaft of the vehicle. It follows, therefore, that despite the existing connection between the engine and the transmission as a result of the engagement of the friction clutch, the gears of the transmission may be easily demeshed and remeshed. It is also to be noted that if, for any reason, the free-wheeling unit 51 fails to operate, the fluid coupling would of itself yield sufficiently, when the accelerator is released to idle the engine, to make possible the aforementioned smooth up-shift operation of the transmission.

An important feature of my invention lies in the combination between the fluid clutch, the friction clutch and the manually and power operated means for operating the latter clutch and the transmission; for should the friction clutch be engaged, with the vehicle at a standstill, the transmission in gear and the engine idling, there results a force from the then operating fluid clutch tending to move the vehicle in a forward direction. Both in hot and in cold weather, particularly the latter, the viscosity of the oil within the fluid clutch is such as to make possible a driving force from the stator or driven clutch element sufficient to move or tend to move the vehicle. However, with my invention, the friction clutch is disengaged and the fluid clutch is thus automatically disconnected from the drivewheels of the vehicle when the vehicle is brought to a standstill. All creeping of the vehicle, when operating it in traffic, is thus prevented, and it is not necessary for the driver of the vehicle to place the transmission in neutral, to depress the clutch pedal or to apply the brake.

As to the cooperation between the transmission operator of my invention and the fluid clutch, it is, of course, preferably to place the transmission in second gear rather than in high gear prior to starting the vehicle. With the mechanism heretofore described, this is automatically accomplished. Furthermore, it is particularly desirable, with the use of a fluid clutch, to place the transmission in high gear after the vehicle has been brought up to the desired speed, and my transmission operator automatically accomplishes this setting of the transmission by merely releasing the accelerator. The power operation of the transmission and friction clutch may be completely eliminated however by opening the dash-mounted cut-out switches 106 and 196. The operation of the vehicle is then limited to the manual operation of the accelerator, the selector 48, the clutch pedal and the brake pedal, the latter being applied to decelerate the vehicle and also being applied if the vehicle tends to creep after it is brought to a stop, and with the transmission and clutch operating power means completely inoperative there is no need for a manual disengagement of the friction clutch preliminary to effecting the manual operation of the transmission in shifting from second gear to high gear or from high gear to second gear, for the operation of the fluid coupling together with the reversal of the engine torque by the release of the accelerator makes possible this operation of the transmission without disengaging the friction clutch. If desired the vehicle may be provided with the aforementioned free-wheeling unit which may be cut out of operation by mechanism including a crank 51 actuated by manually actuated linkage extending to the driver's compartment. Accordingly, when the driver wishes to render this free-wheeling mechanism operative, that is to provide a uni-directional drive, he rotates the crank 51 to its operative position. When the driver wishes to disable the free-wheeling mechanism, that is positively connect the driving shaft of the transmission with the propeller shaft of the vehicle, he moves the crank 51 back to its inoperative position. This free-wheeling mechanism which is usually an over-running clutch, cooperates with the fluid clutch and/or the friction clutch in facilitating the operation of the transmission, for when the friction clutch is disengaged and the vehicle is in motion the transmission is isolated. Substantially the same effect results if the friction clutch is not disengaged, for the slipping fluid clutch transmits very little power when the engine is idling.

Discussing the cooperation between the power means for operating the clutch and the power means for operating the transmission, the governor 116 and the switch 114 operated thereby constitute parts common to both power means, said parts cooperating with the shift rail operated switch 196 and with the switch 112, which in part controls the shifter motor 27.

In brief, the cooperating change-speed transmission, the transmission and clutch operating means and the two clutches constituting my invention provide a very simple and compact mechanism for transmitting driving power from the internal-combustion engine to the rear wheels of the vehicle.

While one illustrative embodiment has been described, it is not my intention to limit the scope of the invention to that particular embodiment, or otherwise than by the terms of the appended claims.

I claim:

1. In an automotive vehicle provided with a friction clutch and a change speed transmission having a low and reverse gear shift rail and a high and second gear shift rail, means for operating the clutch and transmission including a manually operated selector mounted adjacent the steering wheel of the vehicle, manually operated means interconnecting the selector with the transmission and serving, when operated, to move the low and reverse gear shift rail, a pressure differential operated motor operably connected to the clutch, a pressure differential operated motor for moving the second and high gear shift rail of the transmission to establish the same in either second gear or high gear, valve mechanism for controlling the flow of air into and from said transmission operating motor, electro-magnetic means for operating said valve mechanism, and means for controlling the operation of said electro-magnetic means including a switch operated by said first mentioned motor, a governor operable in accordance with the speed of the vehicle and a switch operated by said governor serving, in part, to control the operation of the valve operating electro-magnetic means, and also serving, in part, to control the operation of the clutch operating motor.

2. In an automotive vehicle provided with a friction clutch and a change speed transmission having a low and reverse gear shift rail and a high and second gear shift rail, power operated means for operating the clutch and also the transmission to the extent of moving the high and second gear shift rail thereof, said power means including a pressure differential operated motor operably connected to the clutch, and another pressure differential operated motor operably connected to the transmission, valve means for controlling operation of said motors, means for operating said valve means including a plurality of solenoids, one of said solenoids serving to operate a valve operable to effect a high gear operation of the transmission operating motor, means for controlling the operation of said solenoid including a cut-out switch which is closed when the low and reverse gearshift rail is in its transmission neutral position and the high and second gearshift rail is about to be moved and further including a governor operated switch and a switch operated by the clutch operating motor, manually operated force transmitting means for operating the first mentioned switch and for effecting a shift rail selecting operation of the transmission and other force transmitting means connected to the transmission for moving the low and reverse gearshift rail to establish the transmission either in low gear or reverse gear.

3. In an automotive vehicle provided with a friction clutch and a change speed transmission having a low and reverse gearshift rail and a high and second gearshift rail, means for operating the clutch and transmission including a manually operated selector mounted adjacent the steering wheel of the vehicle, manually operated means interconnecting the selector with the transmission and serving when actuated to effect a movement of the low and reverse shift rail to establish the transmission in either low gear or reverse gear, a pressure differential operated motor operably connected to the clutch, a pressure differential operated motor for moving the second and high gearshift rail of the transmission, and means for controlling the operation of said last mentioned motor, including a breaker switch operably connected to the power element of said first mentioned motor and closed, when the clutch operating motor is energized to disengage the clutch, to make possible the operation of the transmission operating motor, valve mechanism for controlling the flow of air into and from said transmission operating motor, electro-magnetic means for operating said valve mechanism, a governor operated switch, a vehicle speed responsive governor operable when the speed of the vehicle equals or exceeds a predetermined value to so operate said latter switch as to effect an energization of the valve operating electro-magnetic means and thereby initiate a high gear operation of the transmission operating motor.

4. In an automotive vehicle provided with a foot operated member, a clutch, and a transmission which may be established in any one of three forward speed settings or a reverse gear setting, manually operated means for establishing the transmission in either its reverse gear setting or the lowest of its forward speed settings, power means for operating the clutch and for operating the transmission to establish the same in one or the other of the remaining forward speed settings and means for controlling the operation of said power means, including a clutch operated switch, a vehicle speed responsive governor and a governor operated switch, said switches being operative, at or below a predetermined vehicle speed and when the foot operated member is released, to initiate an operation of said power means to establish the transmission in one of the aforementioned forward speed settings, and operative, when the speed of the vehicle exceeds said predetermined speed and the foot operated member is released, to initiate the operation of the power means to establish the transmission in the other of the aforementioned forward speed settings.

5. In an automotive vehicle provided with a clutch and a three-speeds forward and reverse transmission, power means for operating the clutch and for operating the transmission to place the same in either one or the other of two of its forward speed settings, said power means comprising a pressure differential operated motor for operating the clutch and another pressure differential operated motor for operating the transmission, means for controlling the operation of said means comprising valve means for controlling the gaseous pressure within said transmission operating motor, and means for controlling the operation of said valve means comprising a clutch motor operated switch and a vehicle speed responsive governor operated switch operable, when the speed of the vehicle is below a predetermined value, to initiate an operation of the valve controlling means to effect one of the two aforementioned speed settings of the transmission.

6. In an automotive vehicle provided with a friction clutch, a foot operated member, a fluid clutch and a change speed transmission which may be established in reverse gear, in low gear, in second gear or in high gear, manually operated means for operating the friction clutch, power means for disengaging the friction clutch when the foot operated member is released, power means for operating the transmission to establish the same in either second gear or high gear, manually operated means for establishing the transmission in either reverse gear or low gear, and means for controlling the operation of both of said power means including a cut-out switch operable when opened to disable the friction clutch operating power means, a clutch operated switch for, in part, controlling the operation of the transmission operating power means, and further including a governor operated switch, said switch being operative, at or below a predetermined vehicle speed and when the foot operated member is released, to initiate the operation of said power means to establish the transmission in its second gear setting, and operative, when the speed of the vehicle exceeds said predetermined speed and the foot operated member is released, to initiate an operation of the power means to establish the transmission in its high gear setting.

THOMAS L. MAYRATH.